United States Patent
Choi et al.

(10) Patent No.: US 8,018,430 B2
(45) Date of Patent: Sep. 13, 2011

(54) ELECTRO-DIELECTRO-PHORETIC DISPLAY DEVICE AND METHOD THEREOF

(75) Inventors: Jae-young Choi, Yongin-si (KR); Jai-yong Han, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 956 days.

(21) Appl. No.: 11/948,242

(22) Filed: Nov. 30, 2007

(65) Prior Publication Data

US 2009/0046051 A1  Feb. 19, 2009

(30) Foreign Application Priority Data

Aug. 16, 2007  (KR) .................... 10-2007-0082276

(51) Int. Cl.
*G09G 3/34* (2006.01)

(52) U.S. Cl. ........................ 345/107; 359/296
(58) Field of Classification Search .............. 345/107, 345/204; 359/296, 290
See application file for complete search history.

(56) References Cited

U.S. PATENT DOCUMENTS

| | | | |
|---|---|---|---|
| 6,727,881 B1 | 4/2004 | Albert et al. | |
| 6,791,519 B2 * | 9/2004 | Aarts et al. | 345/87 |
| 7,106,297 B2 * | 9/2006 | Shannon et al. | 345/107 |
| 2002/0075556 A1 * | 6/2002 | Liang et al. | 359/296 |
| 2004/0150613 A1 | 8/2004 | Li et al. | |
| 2005/0190431 A1 * | 9/2005 | Matsuda | 359/296 |
| 2006/0038772 A1 * | 2/2006 | Amundson et al. | 345/107 |
| 2006/0279525 A1 * | 12/2006 | Matsuda | 345/107 |
| 2007/0247418 A1 * | 10/2007 | Nakai et al. | 345/107 |

* cited by examiner

*Primary Examiner* — Stephen Sherman
(74) *Attorney, Agent, or Firm* — Cantor Colburn LLP

(57) ABSTRACT

Electrophoretic particles and dielectrophoretic particles are included together in a unit pixel. Each of the electrophoretic particles and the dielectrophoretic particles includes two kinds of particles having different electric properties. The electrophoretic particles include positively charged particles and negatively charged particles. The dielectrophoretic particles include particles having low dielectric constant and particles having high dielectric constant. A first electric field for moving the electrophoretic particles and a second electric field for moving the dielectrophoretic particles are applied to the unit pixel. The second electric field has an asymmetric gradient in the direction where the dielectrophoretic particles move to determine movement directions of the dielectrophoretic particles having different dielectric constants.

20 Claims, 6 Drawing Sheets

ELECTRO-DIELECTRO-PHORETIC DISPLAY DEVICE AND METHOD THEREOF

This application claims priority to Korean Patent Application No. 10-2007-0082276, filed on Aug. 16, 2007, and all the benefits accruing therefrom under 35 U.S.C. §119, the contents of which in its entirety are herein incorporated by reference.

BACKGROUND OF THE INVENTION

1. Field of the Invention

The present invention relates to a display device using a dielectrophoresis and an electrophoresis and a method thereof, and more particularly, to an electro-dielectrophoretic display device displaying color images and a method of displaying color images on such a display device.

2. Description of the Related Art

Reflective displays can realize flexible displays with low costs, and show low power consumption. Therefore, the reflective display can be used as a display device in low power mobile displays. The reflective displays can be electrophoretic displays ("EPDs"), liquid crystal displays ("LCDs"), electrowetting displays ("EWDs"), and electrochromic displays ("ECDs"). Among the above types of reflective displays, the most developed reflective display is the EPD using movements of particles.

Since the reflective display displays images by reflecting external lights, the reflective display only can be used when the external lights exist, and cannot be used in a dark space without the external light or at night. Therefore, a display device that performs as a reflective display in a state where the external light exists and performs as a light emission display in a state where there is no external light has been required.

One conventional EPD includes a capsule including electroluminescence ("EL") particles and particles blocking the light emitted from the EL particles. In this conventional display, a light of desired color can be emitted or blocked in the light emission mode, however, the light of desired color cannot be reflected or blocked in the reflection mode.

Another conventional EPD includes reflective particles and photoluminescence ("PL") particles having the same charges as each other in a cell. In still another conventional EPD, a bright opaque state and a dark opaque state are realized by direct current ("DC") voltage using positive charged particles and negative charged particles, and a transparent state is displayed by alternating current ("AC") voltage, and thus, three states can be realized using one pixel.

BRIEF SUMMARY OF THE INVENTION

It has been determined herein, according to the present invention, that it is difficult to display color images using the conventional EPD and the dielectrophoretic display due to a structural limitation of the pixel.

The present invention provides an electro-dielectrophoretic display device, in which each of unit pixels uses electrophoretic particles and dielectrophoretic particles.

The present invention also provides an electro-dielectrophoretic display device realizing a plurality of display states using the electrophoretic particles and dielectrophoretic particles, and thereby, displaying color images.

The present invention also provides a method of displaying color images in an electro-dielectro-phoretic display device.

According to exemplary embodiments of the present invention, there is provided an electro-dielectro-phoretic display device including electrophoretic particles that are charged, dielectrophoretic particles that are not charged, pixel regions, in which the electrophoretic particles and the dielectrophoretic particles are included, an electrophoretic electrode structure which forms an electric field in each of the pixel regions to induce a selective movement of the electrophoretic particles, and a dielectrophoretic electrode structure which forms an electric field in each of the pixel regions to induce a selective movement of the dielectrophoretic particles.

The electrophoretic electrode structure may include a first electrode and a second electrode, which are disposed on opposing sides of each of the pixel regions to form the electric field which moves the electrophoretic particles. The dielectrophoretic electrode structure may include a third electrode and a fourth electrode, which are disposed on opposing sides of each of the pixel region. The third electrode and the fourth electrode of the dielectrophoretic electrode structure may form an asymmetric electric field gradient that determines the movement direction of the dielectrophoretic particle in each of the pixel regions respectively with the first electrode and the second electrode in the electrophoretic electrode structure. Each of the third electrode and the fourth electrode may include a plurality of electric field concentration portions, which correspond to the first electrode and the second electrode, to concentrate the electric field.

The electrophoretic particles may include negatively charged particles and positively charged particles. The dielectrophoretic particles may include a high dielectrophoretic particle having a high dielectric constant and a low dielectric particle having a low dielectric constant.

The positively charged particles, the negatively charged particles, and the dielectrophoretic particles having the high and low dielectric constants may be reflective particles reflecting visible rays at different wavelengths from each other. The visible rays reflected by the particles may be red, blue, green, and white rays.

According to other exemplary embodiments of the present invention, a method of displaying color images on a display device includes forming a plurality of pixel regions in the display device, including charged electrophoretic particles in the pixel regions, including uncharged dielectrophoretic particles in the pixel regions, inducing a selective movement of the electrophoretic particles by forming an electrophoretic electrode structure to form an electric field in each of the pixel regions, and inducing a selective movement of the dielectrophoretic particles by forming a dielectrophoretic electrode structure to form an electric field in each of the pixel regions.

The electrophoretic particles may include negatively charged particles having a first color and positively charged particles having a second color different than the first color, and inducing the selective movement of the electrophoretic particles by forming an electrophoretic electrode structure may include forming a first electrode on a first side of each of the pixel regions and forming a second electrode on an opposite second side of each of the pixel regions and applying opposite charges to the first and second electrodes.

The dielectrophoretic particles may include high dielectrophoretic particles having a third color different than the first and second colors and low dielectrophoretic particles having a fourth color different than the first, second, and third colors, and inducing the selective movement of the dielectrophoretic particles by forming a dielectrophoretic electrode structure may include forming a third electrode on the first side of each of the pixel regions and forming a fourth electrode on the second side of each of the pixel regions.

The method may further include locating the electrophoretic particles and the dielectrophoretic particles in a medium between the first and third electrodes and the second and fourth electrodes, wherein a dielectric constant of the high dielectrophoretic particles is higher than a dielectric constant of the medium and a dielectric constant of the low dielectrophoretic particles is lower than the dielectric constant of the medium.

The method may further include forming a plurality of electric field concentration portions on the third and fourth electrodes.

Inducing the selective movement of the dielectrophoretic particles may further include applying oppositely charged voltages to the first electrode and the fourth electrode or applying oppositely charged voltages to the second electrode and the third electrode.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
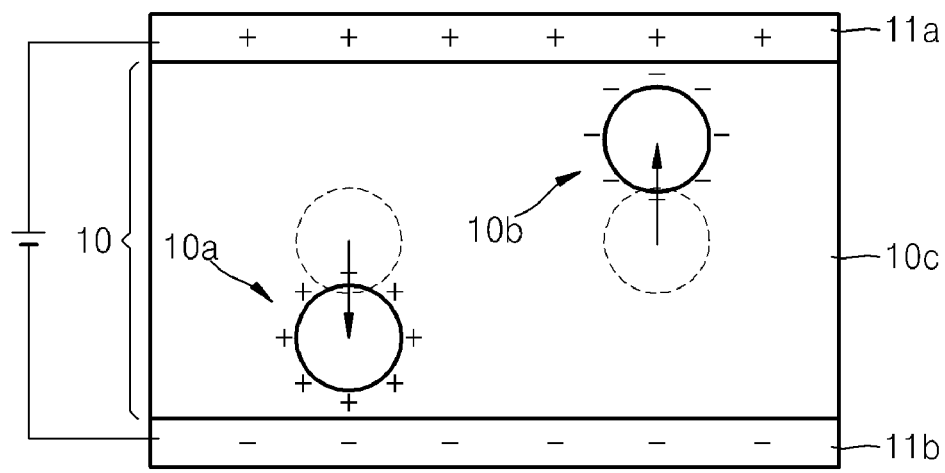
FIG. 1 is a diagram illustrating movement of exemplary particles by an electrophoresis.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, an electro-dielectro-phoretic display device according to exemplary embodiments of the present invention will be described with reference to accompanying drawings.

The present invention uses two types of electrophoretic particles having different polarities and two types of electrophoretic particles having different dielectric constants. In more detail, the present invention uses four types of particles, which respectively reflect red, blue, green, and white colors and are selectively moved by a method that will be described later. The selective movements of the particles include the movements of two types of particles by the electrophoresis under a direct current ("DC") voltage and movements of two types of dielectro-phoretic particles under an alternating current ("AC") voltage.

<Electrophoresis>

As shown in FIG. 1, a pixel region 10 includes a medium 10c, a positive charged particle 10a and a negative charged particle 10b provided in the medium 10c. Electrodes 11a and 11b operating the particles 10a and 10b are located on opposing sides of the pixel region 10. The electrodes 11a and 11b may be respectively formed on substrates, not shown. When a positive voltage is applied to the first electrode 11a and a negative voltage is applied to the second electrode 11b, the negative charged particle 10b moves toward the first electrode 11a and the positive charged particle 10a moves toward the second electrode 11b. When the opposite voltages are applied to the electrodes 11a and 11b, such as a negative voltage applied to the first electrode 11a and a positive voltage applied to the second electrode 11b, the particles 10a and 10b also move toward the opposite sides. The particles 10a and 10b can reflect the lights of different wavelengths from each other, and accordingly, images can be displayed.

<Dielectrophoresis>

Figure 2A:
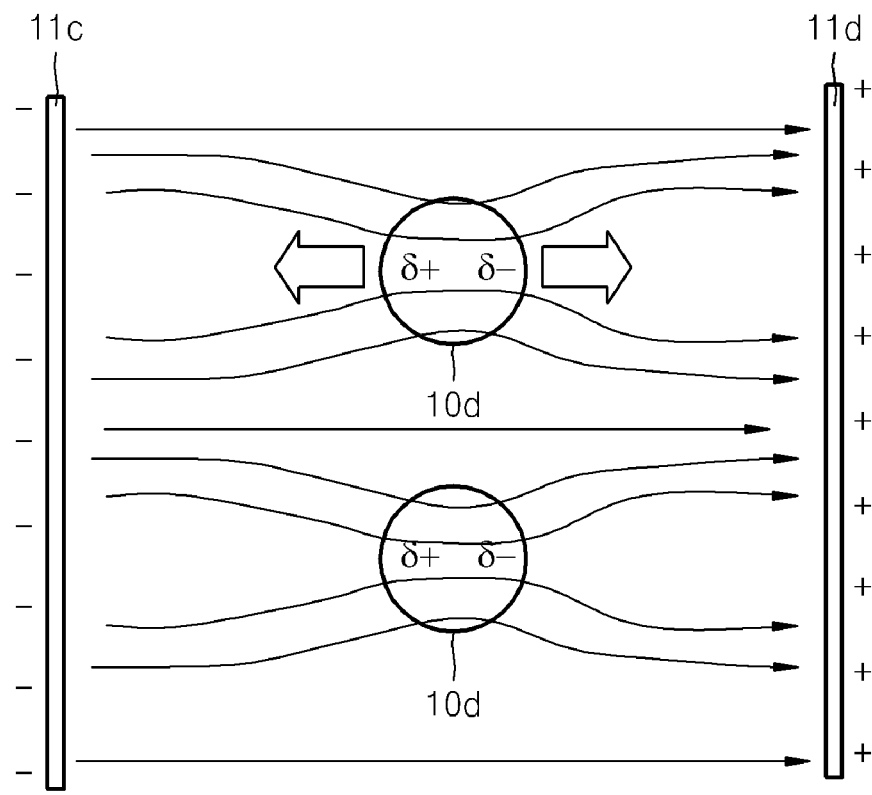
FIGS. 2A and 2B are diagrams illustrating movements of exemplary dielectro-phoretic particles under a symmetric electric field and an asymmetric electric field, respectively.
Figure 2B:
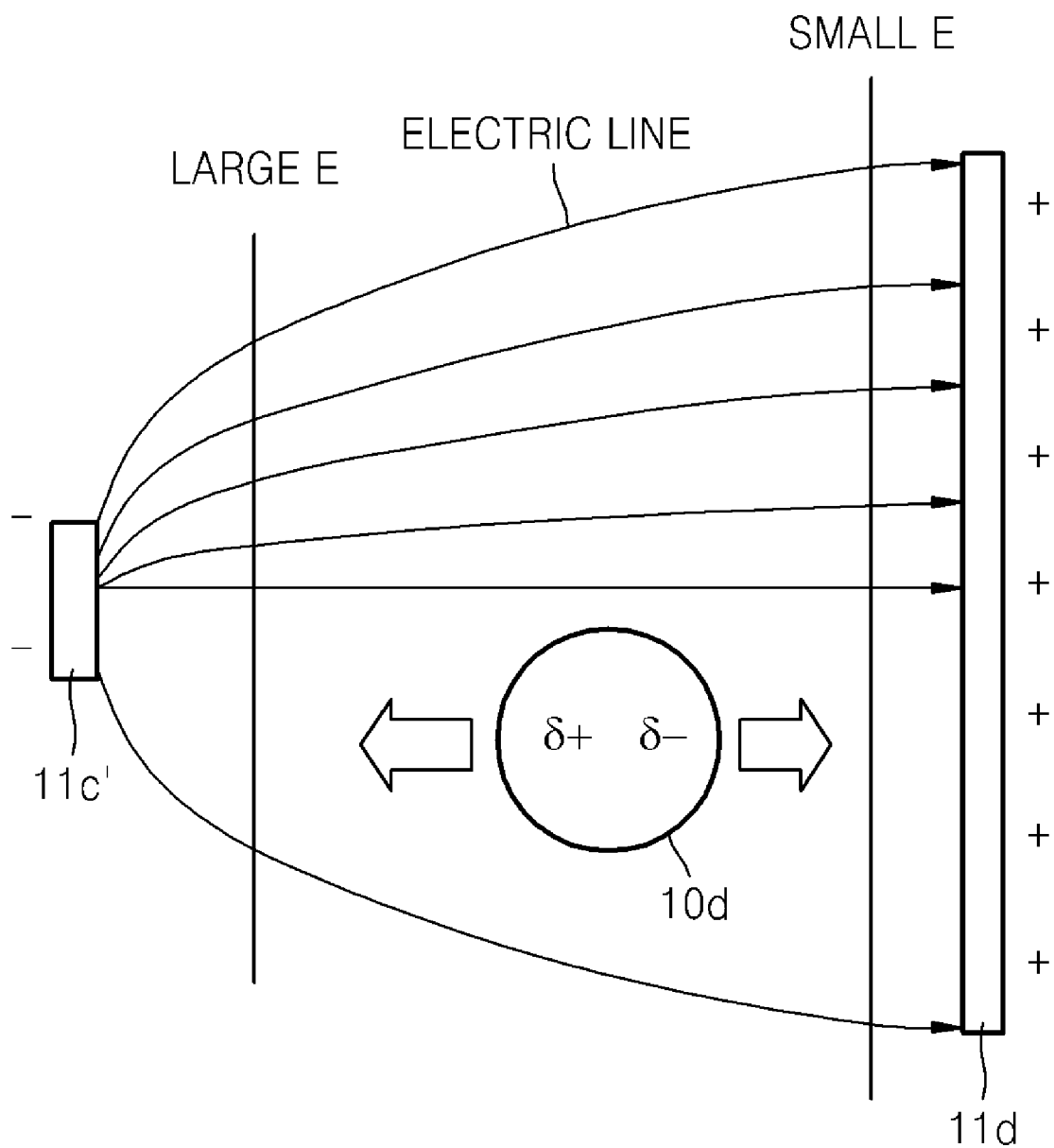

FIGS. 2A and 2B are diagrams illustrating power applied to an exemplary dielectrophoretic particle under an electric field. FIG. 2A shows a static state of the exemplary dielectrophoretic particle in a symmetric electric field, and FIG. 2B shows a movement of the exemplary dielectrophoretic particle in an asymmetric electric field.

As shown in FIG. 2A, a first electrode 11c and a second electrode 11d are located to face each other, and dielectrophoretic particles 10d are located between the first and second electrodes 11c and 11d. The dielectrophoretic particle 10d includes a dielectric material that is not charged. When the dielectrophoretic particles 10d are placed on the symmetric electric field formed by both electrodes 11c and 11d, a polarization occurs, that is, negative charges and positive charges are separated on both sides of the dielectrophoretic particles 10d, with the negative charges on the side of the dielectrophoretic particles 10d closer to the positively charged one of the electrodes 11c and 11d (in this case second electrode 11d), and with the positive charges on the side of the dielectrophoretic particles 10d closer to the negatively charged one of the electrodes 11c and 11d (in this case first electrode 11c). Here, since the electric is symmetrically formed, Coulombic forces applied to both sides of the dielectrophoretic particle 10d are equal to each other, and thus, there is no net force causing the movement of the dielectrophoretic particles 10d.

As shown in FIG. 2B, if a width of a first electrode 11c' is narrower than that of the second electrode 11d or is protruded, as described below with respect to FIGS. 4A to 6, an asymmetric electric field is formed on the pixel region between the electrodes 11c' and 11d. In the asymmetric electric field, the dielectrophoretic particle 10d is polarized. Negative charges and positive charges are separated on both sides of the dielectrophoretic particles 10d. Here, since the electric field is asymmetric, different Coulombic forces are applied to the dielectrophoretic particle 10d. That is, there is an electric field gradient caused by the small electric field and a large electric field on both sides of the dielectrophoretic particle 10d. The dielectrophoretic particle 10d is pulled to a direction by the asymmetric Coulombic force. That is, the net force with respect to the dielectrophoretic particle 10d is applied in a direction of the large electric field, that is, a direction where a concentration of electric flux is high, by the electric field gradient. The net force causing the movement of the dielectrophoretic particle 10d occurs also under the AC voltage, not only in the DC voltage.

According to the above description, the dielectrophoretic particle 10d does not move in the symmetric electric field as shown in FIG. 2A, and the movement of the dielectrophoretic particle 10d can be controlled by the electric field gradient in the asymmetric electric field as shown in FIG. 2B. Therefore, the present invention realizes the exemplary color display device using the above two operations. Hereinafter, an image display using the electrophoresis and an image display using the dielectrophoresis will be described in more detail.

Figure 3:
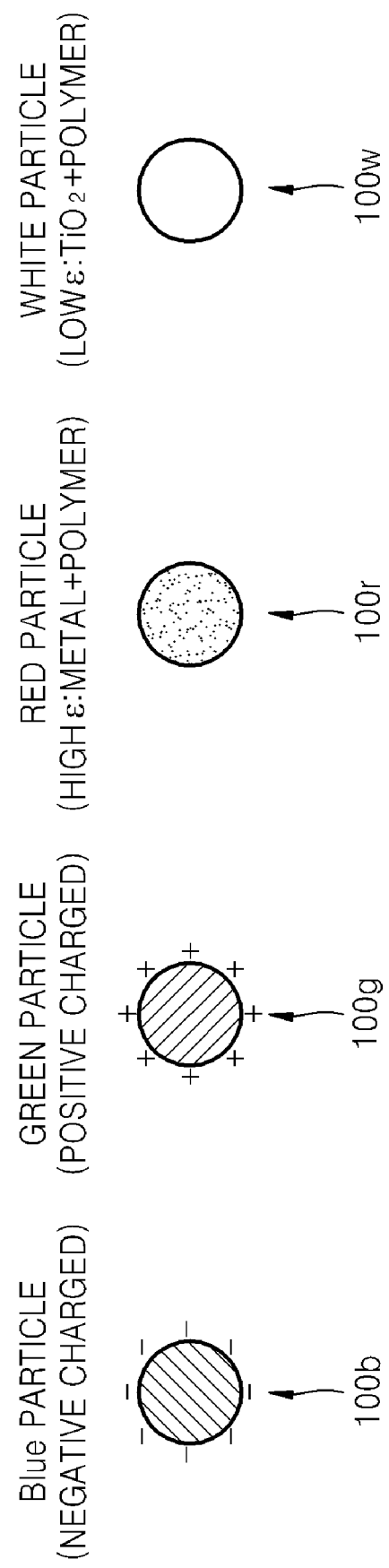
FIG. 3 is a diagram showing detailed examples of exemplary electrophoretic particles and exemplary dielectrophoretic particles according to an exemplary embodiment of the present invention.

FIG. 3 shows four types of exemplary particles used in the exemplary display device according to the present invention and characteristics thereof.

In an exemplary embodiment, electrophoretic particles include a blue particle 100b that is negatively charged and a green particle 100g that is positive charged. In addition, dielectrophoretic particles include a red particle 100r and a white particle 100w formed of dielectric materials that are not charged. The red particle 100r and the white particle 100w that are formed of the dielectric materials have different dielectric constants from each other. In an exemplary embodiment, the red particle 100r has a dielectric constant that is higher than that of a medium 100 that will be described later, and the white particle 100w has a dielectric constant that is lower than that of the medium 100. While it is described for exemplary purposes that the electrophoretic particles include the blue particle 100b and the green particle 100g, and the dielectrophoretic particles include the red particle 100r and the white particle 100w, the present invention is not limited thereto, and the specific colors for the exemplary display device and the electrophoretic and dielectrophoretic particles may be changed.

In an exemplary embodiment of the display device including the blue particle 100b, the green particle 100g, the red particle 100r, and the white particle 100w, materials forming the above particles may include the following:

Negatively Charged Particle:

Polymer particle including a pigment representing a color, such as but not limited to blue, the polymer having a surface that is coated with a charge generator applying the negative charge.

Positively Charged Particle:

Polymer particle including a pigment representing a color, such as but not limited to green, the polymer having a surface that is coated with a charge generator applying the positive charge.

High Dielectric Particle:

Polymer particle including a pigment representing a color, such as but not limited to red, the polymer including a particle having a high dielectric constant Low Dielectric Particle:

Polymer particle including a pigment representing a color, such as but not limited to white, the polymer including a particle having a low dielectric constant Electrolyte (Medium):

Polar solvent and nonpolar solvent may be used as follows, but are not limited thereto.

Water, alcohol, epoxide-based: decane epoxide, dodecane epoxide, vinyl ether-based: cyclohyxyl vinyl ether, aromatic hydrocarbon-based: toluene, naphthalene, halogenated organic solvent based: tetrafluorodibromeethylene, tetracholoroethylene, trifluorocholoroethylene, hydrocarbon based: dodecane, tetradecane Pigment:
R color reflection: red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, C.I. pigment red 2, Oil red dye G color reflection: chrome green, chromium oxide, pigment green B, C.I pigment green 7, malachite green lake, final yellow green G, Malachite Green B color reflection: C.I. pigment blue 15:3, C.I. pigment blue 15, Berlin blue, cobalt blue, alkali blue lake, Victoria blue lake, phthalocyanine blue, metal-free phtahlocyanine blue, first sky blue, and Indunsren blue BC, Oil Blue dye Polymer: polystyrene, polyethylene, polypropylene, phenolic resin, polyesters, polyacrylate, polymethacrylate, ethylene acrylic acid, methacrylic acid copolymer, acrylic copolymer, terpolymer, polyisoprene, polyisobytylene, polystearyl metacrylate Positive charge generator: triisopropanolamine, triethanolamine, ethanolamine, 3-amino-1 propanol, o-aminophenol, 5-amino-1-petanol, tetra(2-hydroxyethyl)ethylene-diamine Negative charge generator: organic sulfate, organic sulfonate, organic phosphate, organic phosphonate can be used, in more detail, bis(2-ethyl hexyl) sodium sulfosuccinate, calcium dodecyl benzene sulfonate, calcium petroleum sulfonate, dodecylbenzenesulfonic acid sodium salt, sodium salts of phosphated mono- and di-clyceride with saturate and unsaturated acid substituents The polymer particle including the pigment and the dielectric particle may be formed using a mechanical method (such as attrition or ball milling) or a chemical method (such as micoencapculation or dispersion polymerization).

Figure 4A:
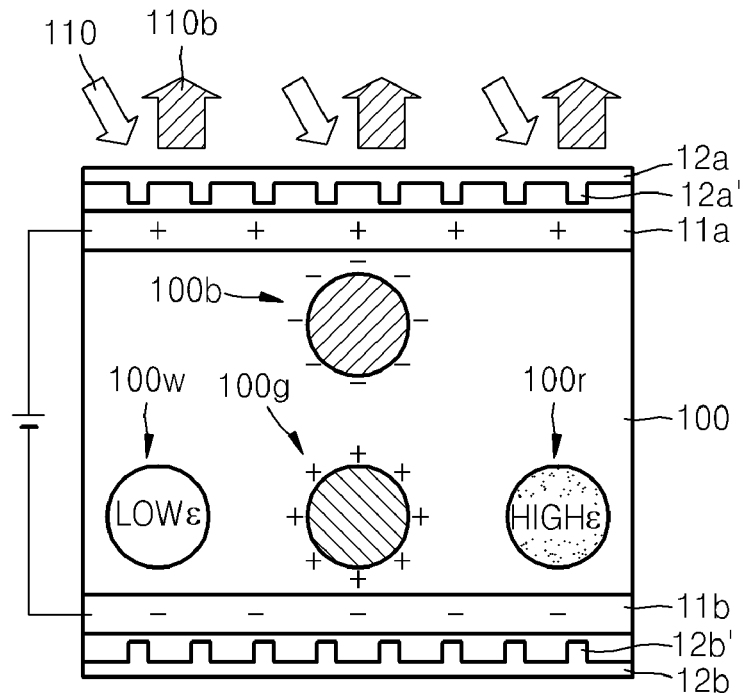
FIGS. 4A and 4B are diagrams illustrating a display of two colors using an electrophoresis in an exemplary electro-dielectro-phoretic display device according to an exemplary embodiment of the present invention.
Figure 4B:
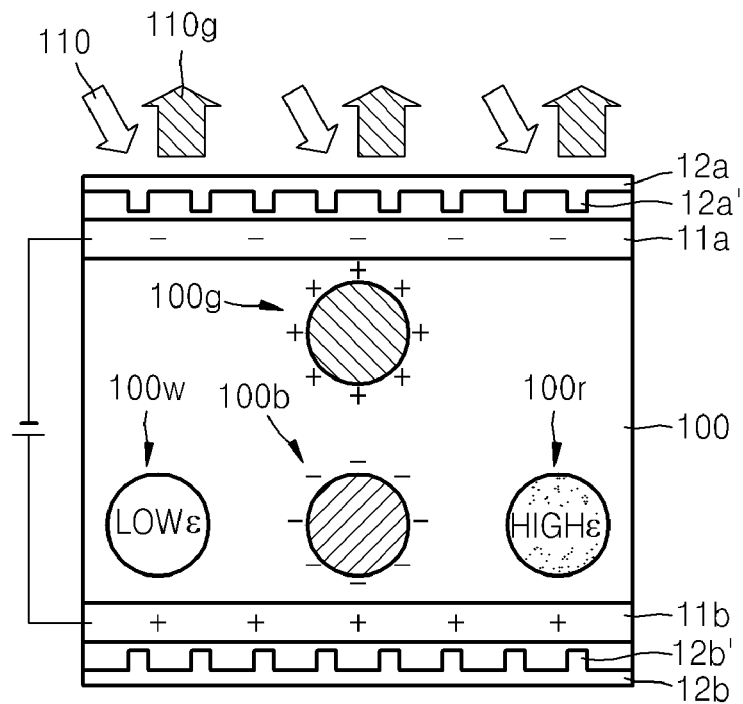

FIGS. 4A and 4B are diagrams illustrating representations of two colors using the electrophoresis in the exemplary electro-dielectro-phoretic display device according to the exemplary embodiment of the present invention.

As shown in FIGS. 4A and 4B, the red, blue, green, and white particles $100r$, $100b$, $100g$, and $100w$ are disposed in the medium $100$. The medium $100$ formed of a liquid electrolyte is disposed between an electrophoretic electrode structure $11a$, $11b$ and a dielectrophoretic electrode structure $12a$, $12b$. The electrophoretic electrode structure includes a first electrode $11a$ and a second electrode $11b$ that are plane or at least substantially planar, and the dielectrophoretic electrode structure includes a third electrode $12a$ and a fourth electrode $12b$, which respectively include protruding electric field concentration portions $12a'$ and $12b'$. Locations of the electrode structures may be adjusted according to embodiments, and may be modified to any types that can form the desired electric field in the medium $100$.

In the above state, as shown in FIG. 4A, when the first electrode $11a$ is positively charged and the second electrode $11b$ is negatively charged, the blue particle $100b$ that is the negatively charged particle moves toward the first electrode $11a$, to which the positive voltage is applied, and the green particle $100g$ that is positively charged moves toward the second electrode $11b$, to which the negative voltage is applied. In this state, external lights $110$ are incident into the first electrode $11a$, and then, blue lights $110b$ are reflected to display the blue color and the other lights are absorbed.

As shown in FIG. 4B, when the opposite voltages are applied to the first electrode $11a$ and the second electrode $11b$, the blue particle $100b$ and the green particle $100g$ move toward the opposite directions. That is, the blue particle $100b$ moves towards positively charged second electrode $11b$ and the green particle $100g$ moves towards negatively charged first electrode $11a$. Therefore, when the external lights $110$ are incident, the green particle $100g$ reflects green light $110g$ to display the green color, and the other lights are absorbed.

The movements of electrophoretic particles, that is, the blue particle $100b$ and the green particle $100g$, can be induced by applying the voltages to the electrophoretic electrode structure $11a$ and $11b$, and at this time, the red particle $100r$ and the white particle $100w$ that are the dielectrophoretic particles are not moved because they are not charged.

Figure 5A:
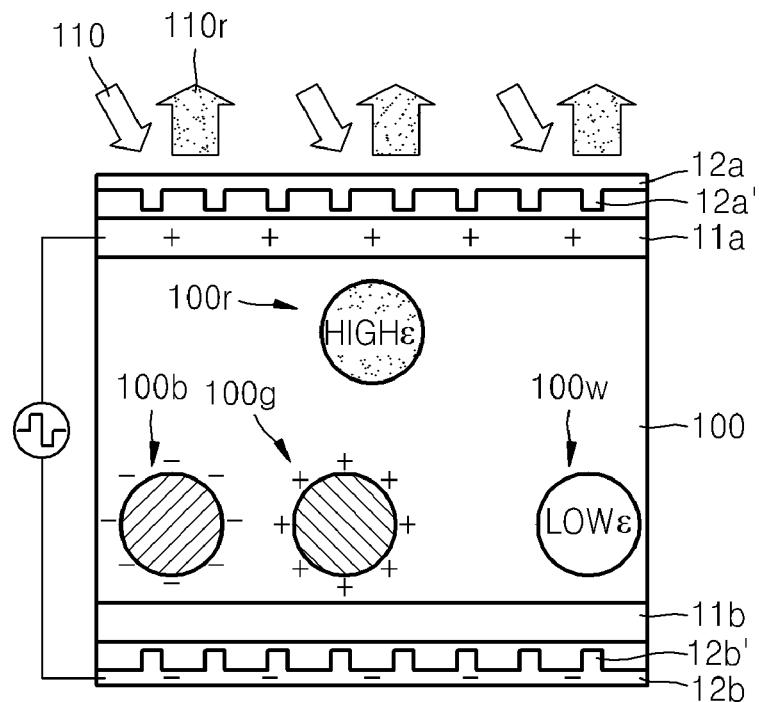
FIGS. 5A and 5B are diagrams illustrating a display of two colors using a dielectrophoresis in the exemplary electro-dielectro-phoretic display device according to the exemplary embodiment of the present invention.
Figure 5B:
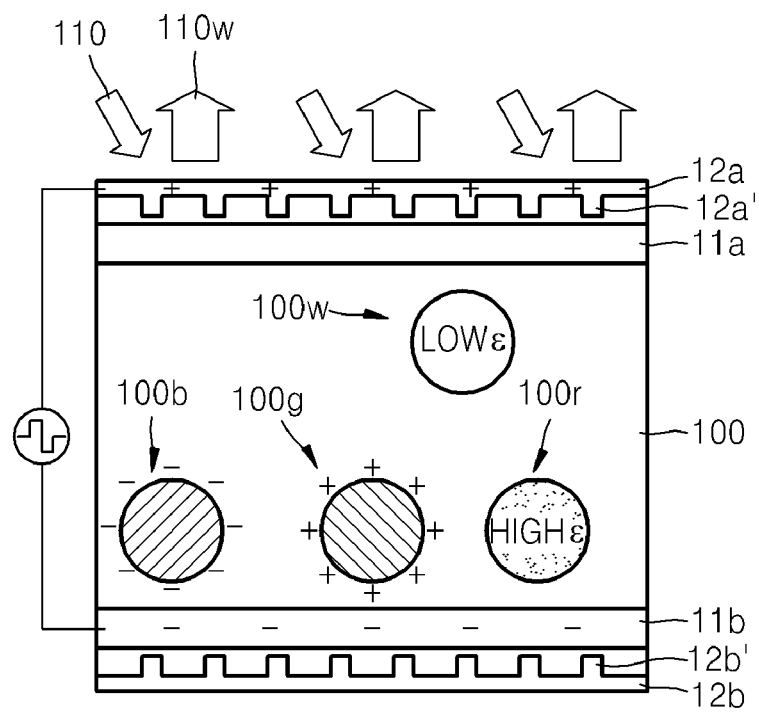

FIGS. 5A and 5B are diagrams showing representations of two colors using the dielectrophoresis in the exemplary electro-dielectro-phoretic display device according to the exemplary embodiment of the present invention.

As described above with respect to FIG. 2B, the dielectrophoresis makes the dielectrophoretic particles move using the asymmetric electric field. In the dielectrophoresis operation, the dielectrophoretic electrode structure $12a$, $12b$ is used. Here, one of the third electrode $12a$ and the fourth electrode is used $12b$, and one of the electrophoretic electrode structure $11a$, $11b$, that is, the second electrode $11b$ or the first electrode $11a$, is used on the other side of the pixel region according to the movement direction of the dielectrophoretic particle $100r$ or $100w$.

Referring to FIG. 5A, AC voltages are applied to the first electrode $11a$ and the fourth electrode $12b$. Here, since the fourth electrode $12b$ includes the electric field concentration portion $12b'$, the concentration of electric flux is high on the side of the fourth electrode $12b$, and the concentration of the electric flux is relatively low at the side of the first electrode $11a$. That is, the electric field concentration portion $12b'$ of the fourth electrode $12b$ corresponds to the first electrode $11c'$ having a narrow width shown in FIG. 2B, and thus, the asymmetric electric field shown in FIG. 2B is formed between the electric field concentration portion $12b'$ of the fourth electrode $12b$ and the first electrode $11a$. Therefore, the red particle $100r$ having the dielectric constant that is higher than that of the medium $100$ moves toward the first electrode $11a$, and the white particle $100w$ having the dielectric constant that is lower than that of the medium $100$ moves toward the fourth electrode $12b$ and the second electrode $11b$. When the external lights $110$ are incident onto the first electrode $11a$, the red lights $110r$ are reflected to display the red color and the other lights are absorbed. Here, the blue and green particles $100b$ and $100g$ that are charged particles vibrate corresponding to a frequency of the AC voltage, and substantially maintain the static status without moving in a certain direction.

Referring to FIG. 5B, the AC voltage is applied to the second electrode $11b$ and the third electrode $12a$. According to this voltage application, the concentration of electric flux of the portion close to the third electrode $12a$ or the first electrode $11a$ is higher than that of the opposite portion closer to the second electrode $11b$ and fourth electrode $12b$ due to the electric field concentration portion $12a'$ of the third electrode $12a$, and thus, the red particle $100r$ and the white particle $100w$ that are the dielectrophoretic particles move in opposite directions. That is, the electric field concentration portion $12a'$ of the third electrode $12a$ corresponds to the first electrode $11c'$ having the narrow width shown in FIG. 2B, and thus, the asymmetric electric field shown in FIG. 2B is formed between the electric field concentration portion $12a'$ of the third electrode $12a$ and the first electrode $11a$. Therefore, the white particle $100w$ moves toward the first electrode $11a$, through which the external lights $110$ are incident, or toward the third electrode $12a$, and the red particle $100r$ moves toward the second electrode $11b$ or the fourth electrode $12b$.

When the external lights 110 are incident, the white light 110w is reflected by the white particle 100w to display the white color.

Figure 6:
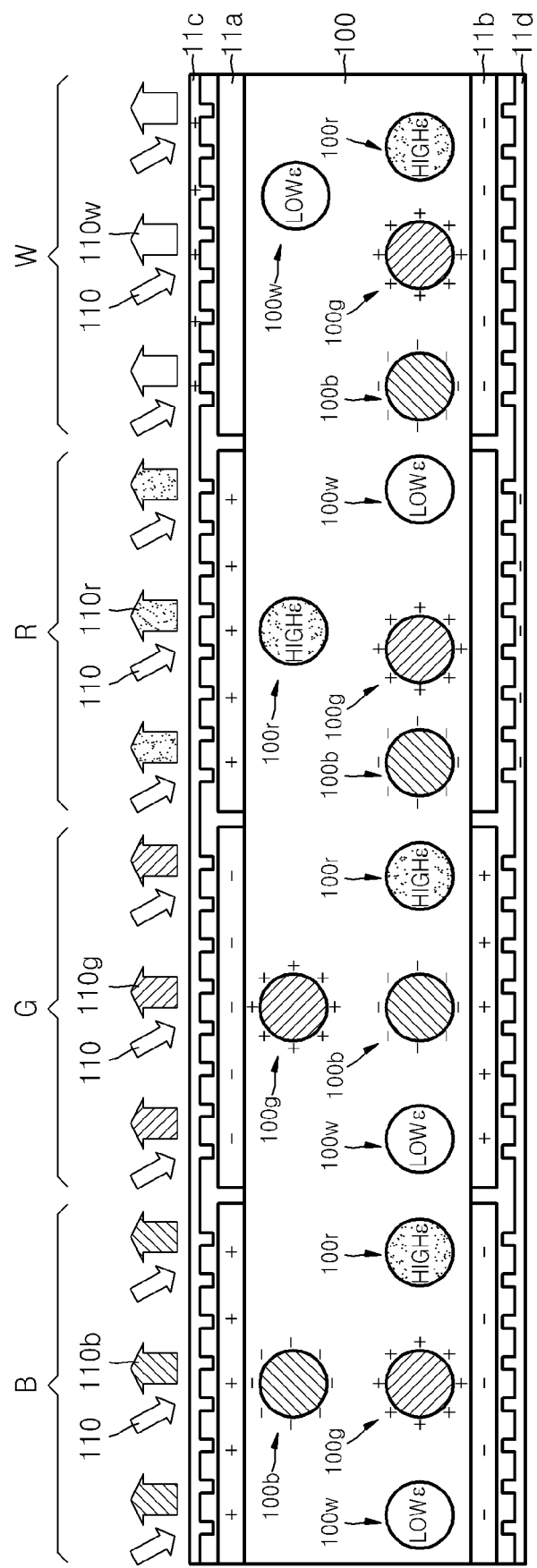
FIG. 6 is a diagram showing an example of the exemplary electro-dielectro-phoretic display device according to the exemplary embodiment of the present invention.

FIG. 6 shows an exemplary embodiment of the display device including a plurality of exemplary unit display device cells (four cells in the present embodiment). According to the exemplary display device of the present invention, a mixture of four types of particles is used, and movements of the four types of particles are determined by the driving voltages applied to the two types of electrode structures. Therefore, barrier ribs are not required to realize the color display. Since the barrier ribs are not required, the reflective color display device can be formed more easily than a conventional display device requiring barrier ribs.

The present invention can be applied to the display using the movements of particles, and in particular, a unit pixel can display four colors by using the dielectrophoresis and the electrophoresis. Therefore, the present invention can be suitable for exemplary color display devices, for example, a paper type color display device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electro-dielectro-phoretic display device comprising:
    electrophoretic particles that are charged;
    dielectrophoretic particles that are not charged;
    pixel regions, in which the electrophoretic particles and the dielectrophoretic particles are included;
    an electrophoretic electrode structure, which is disposed on opposing sides of the pixel regions and which forms an electric field in each of the pixel regions to induce a selective movement of the electrophoretic particles; and
    a dielectrophoretic electrode structure which forms an electric field in each of the pixel regions to induce a selective movement of the dielectrophoretic particles,
    wherein the electrophoretic electrode structure is formed between the pixel regions and the dielectrophoretic electrode structure.

2. The electro-dielectro-phoretic display device of claim 1, wherein the electrophoretic electrode structure includes a first electrode and a second electrode, which are disposed on opposing sides of each pixel region to form the electric field which moves the electrophoretic particles.

3. The electro-dielectro-phoretic display device of claim 2, wherein the dielectrophoretic electrode structure includes a third electrode and a fourth electrode, which respectively are disposed on the first electrode and the second electrode.

4. The electro-dielectro-phoretic display device of claim 3, wherein the third electrode and the fourth electrode of the dielectrophoretic electrode structure form an asymmetric electric field gradient that determines movement direction of the dielectrophoretic particles in the pixel regions respectively with the first electrode and the second electrode in the electrophoretic electrode structure.

5. The electro-dielectro-phoretic display device of claim 4, wherein a plurality of electric field concentration portions, which correspond to the first electrode and the second electrode, are formed in each of the third electrode and the fourth electrode to concentrate the electric field.

6. The electro-dielectro-phoretic display device of claim 2, wherein the electrophoretic particles and the dielectrophoretic particles are located in a medium that is formed of a liquid electrolyte.

7. The electro-dielectro-phoretic display device of claim 1, wherein the dielectrophoretic electrode structure includes a third electrode and a fourth electrode, which respectively are disposed on the first electrode and the second electrode.

8. The electro-dielectro-phoretic display device of claim 7, wherein the third electrode and the fourth electrode of the dielectrophoretic electrode structure form an asymmetric electric field gradient that determines movement direction of the dielectrophoretic particles in the pixel regions respectively with a first electrode and a second electrode in the electrophoretic electrode structure.

9. The electro-dielectro-phoretic display device of claim 8, wherein a plurality of electric field concentration portions, which correspond to the first electrode and the second electrode, are formed in each of the third electrode and the fourth electrode to concentrate the electric field.

10. The electro-dielectro-phoretic display device of claim 1, wherein the electrophoretic particles include negatively charged particles and positively charged particles.

11. The electro-dielectro-phoretic display device of claim 10, wherein the dielectrophoretic particles include a high dielectrophoretic particle having a high dielectric constant and a low dielectric particle having a low dielectric constant.

12. The electro-dielectro-phoretic display device of claim 11, wherein the electrophoretic particles and the dielectrophoretic particles are located in a medium that is formed of a liquid electrolyte.

13. The electro-dielectro-phoretic display device of claim 12, wherein the dielectric constant of the high dielectrophoretic particle is higher than that of the medium, and the dielectric constant of the low dielectrophoretic particle is lower than that of the medium.

14. The electro-dielectro-phoretic display device of claim 1, wherein the electrophoretic particles and the dielectrophoretic particles are located in a medium that is formed of a liquid electrolyte.

15. A method of manufacturing a display device, the method comprising:
    forming a plurality of pixel regions in the display device;
    including charged electrophoretic particles in the pixel regions;
    including un-charged dielectrophoretic particles in the pixel regions;
    inducing a selective movement of the electrophoretic particles by forming an electrophoretic electrode structure on opposing sides of the pixel regions to form an electric field in each of the pixel regions; and,
    inducing a selective movement of the dielectrophoretic particles by forming a dielectrophoretic electrode structure to form an electric field in each of the pixel regions,
    wherein the electrophoretic electrode structure is formed between the pixel regions and the dielectrophoretic structure.

16. The method of claim 15, wherein the electrophoretic particles include negatively charged particles having a first color and positively charged particles having a second color different than the first color, and inducing the selective movement of the electrophoretic particles by forming an electrophoretic electrode structure includes forming a first electrode on a first side of each of the pixel regions and forming a second electrode on an opposite second side of each of the pixel regions and applying opposite charges to the first and second electrodes.

17. The method of claim 16, wherein the dielectrophoretic particles include high dielectrophoretic particles having a third color different than the first and second colors and low dielectrophoretic particles having a fourth color different than the first, second, and third colors, and inducing the selective movement of the dielectrophoretic particles by forming a dielectrophoretic electrode structure includes forming a third electrode on the first side of each of the pixel regions and forming a fourth electrode on the second side of each of the pixel regions.

18. The method of claim 17, further comprising locating the electrophoretic particles and the dielectrophoretic particles in a medium between the first and third electrodes and the second and fourth electrodes, wherein a dielectric constant of the high dielectrophoretic particles is higher than a dielectric constant of the medium and a dielectric constant of the low dielectrophoretic particles is lower than the dielectric constant of the medium.

19. The method of claim 17, further comprising forming a plurality of electric field concentration portions on the third and fourth electrodes.

20. The method of claim 17, wherein inducing the selective movement of the dielectrophoretic particles further includes applying oppositely charged voltages to the first electrode and the fourth electrode or applying oppositely charged voltages to the second electrode and the third electrode.

* * * * *